United States Patent
Stein et al.

(10) Patent No.: US 10,411,594 B1
(45) Date of Patent: Sep. 10, 2019

(54) DC-DC CONVERTER WITH REGULATOR HAVING A PLURALITY OF PARAMETER SETS

(71) Applicant: Robert Bosch GmbH, Stuttgart (DE)

(72) Inventors: Thomas Stein, Wald (DE); Fabian Hoffmeister, Schoenau (DE); Josef Plager, Bogen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/202,361

(22) Filed: Nov. 28, 2018

(51) Int. Cl.
*H02M 3/156* (2006.01)
*H02M 1/42* (2007.01)
*H02M 1/00* (2006.01)

(52) U.S. Cl.
CPC ......... *H02M 3/156* (2013.01); *H02M 1/4225* (2013.01); *H02M 2001/0009* (2013.01); *H02M 2001/0025* (2013.01)

(58) Field of Classification Search
CPC ....... H02M 3/156–158; H02M 3/1584; H02M 3/1588; H02M 1/32; H02M 1/42; H02M 1/4208; H02M 1/4225; H02M 2001/0009; H02M 2001/0025; H02M 2001/0032; H02J 7/02; H02J 7/12; G05F 1/33; G05F 1/34; G05F 1/38; Y02B 70/126; B60L 3/00; B60L 11/18
USPC ..................... 323/222–224, 287; 363/89, 125
See application file for complete search history.

(56) References Cited

U.S. PATENT DOCUMENTS

| | | | | |
|---|---|---|---|---|
| 8,723,438 | B2 * | 5/2014 | Melanson | H02M 1/4225 315/209 R |
| 9,178,415 | B1 * | 11/2015 | Kost | H02M 3/157 |
| 9,197,132 | B2 * | 11/2015 | Artusi | H02M 1/4225 |

FOREIGN PATENT DOCUMENTS

DE     102010063126     6/2012

\* cited by examiner

*Primary Examiner* — Yemane Mehari
(74) *Attorney, Agent, or Firm* — Michael Best & Friedrich LLP

(57) ABSTRACT

A converter is provided for converting a DC input voltage (UE) into a DC output voltage (UA). The converter includes a regulator for regulating the DC output voltage (UA) to a target value (UAS), wherein the regulator comprises a parameter set that determines the regulation behavior thereof. The converter includes a measurement module for determining at least one characteristic value (K) of at least one characteristic parameter of the converter, and at least two interchangeable parameter sets for the regulator Each one of the parameter sets can be activated in the regulator, wherein a first one of the parameter sets has a slower regulation behavior with regard to the DC output voltage (UA) than a second of the parameter sets. The converter includes a control module for the exchange and activation of each of the parameter sets in the regulator depending on at least one of the characteristic parameters.

17 Claims, 1 Drawing Sheet

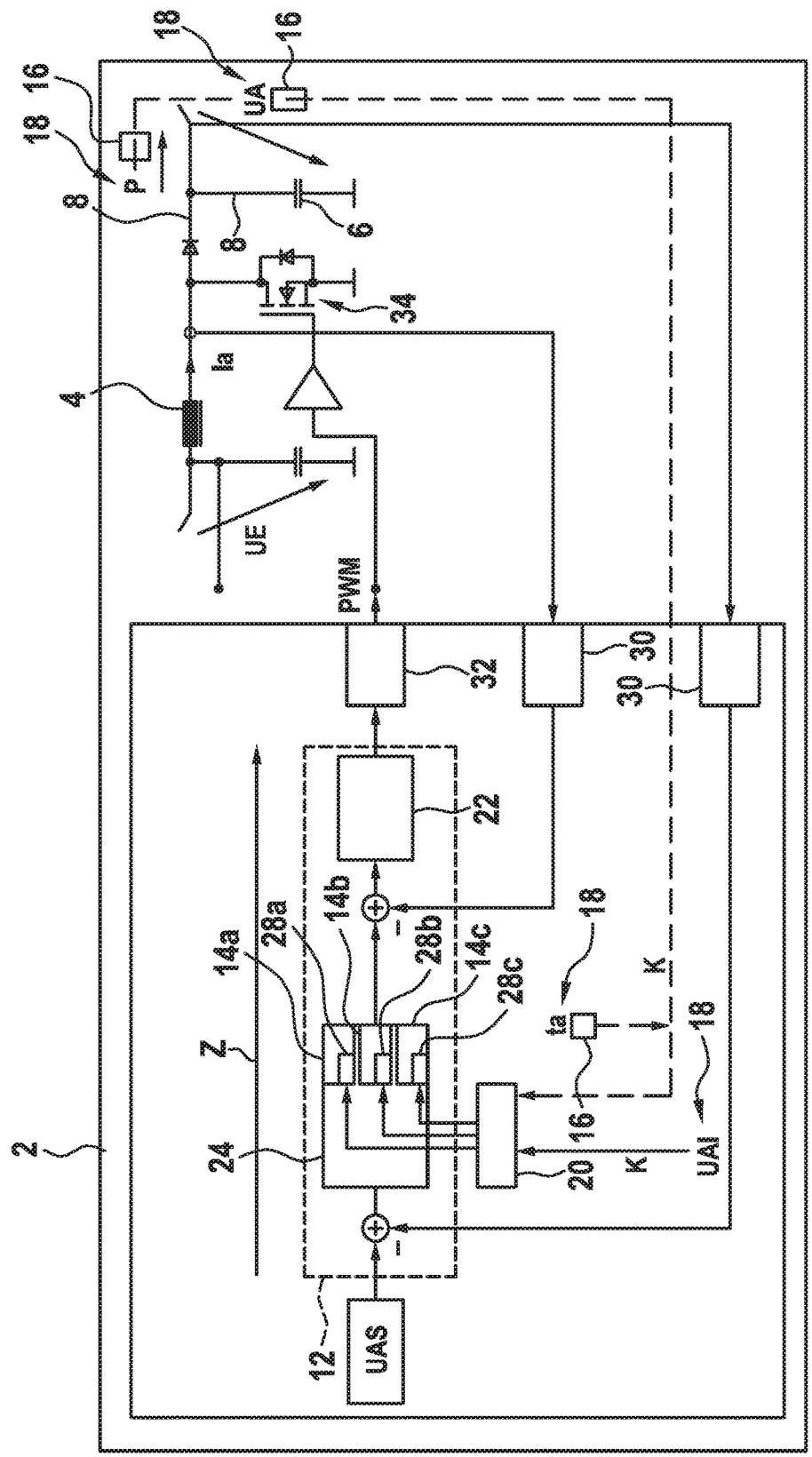

DC-DC CONVERTER WITH REGULATOR HAVING A PLURALITY OF PARAMETER SETS

BACKGROUND OF THE INVENTION

Due to increasingly stringent regulatory requirements more and more electronic devices contain devices which optimize the supply current consumed in terms of the harmonics contained therein. Conventionally designed switching power supplies usually have a rectifier and a smoothing capacitor. The latter is only charged under load when the instantaneous value of the sinusoidal supply voltage rises above the DC potential of the smoothing capacitor. The consequence is only a short current pulse, which recharges the capacitor. A Fourier analysis of this current waveform usually shows numerous harmonics. Depending on the relevant standard, this may make approval or certification more difficult or even impossible.

It is known from patent DE 10 2010 063 126 A1 that in order to charge the high-voltage vehicle battery of a hybrid or electric vehicle via, for example, a public mains power supply, a charging device is required. Known charging devices for high-voltage vehicle batteries usually consist of a rectifier with line filter, a power factor correction circuit as well as a potential separation device.

SUMMARY OF THE INVENTION

In the context of the invention a converter for converting a DC input voltage into a DC output voltage is proposed. Preferred or advantageous embodiments of the invention as well as other categories of the invention are obtained from the claims, the following description and the attached FIGURES. The voltage of the DC input voltage is preferably almost constant over time.

Preferably, the DC input voltage is a DC voltage which has been generated from a sinusoidal alternating voltage by rectification and subsequent smoothing, in such a way that the voltage is nearly constant over time. Alternatively, the DC input voltage is a pulsed DC voltage, which was generated from a sinusoidal alternating voltage by rectification, for example by means of a bridge circuit, with either no or only minor subsequent smoothing.

The converter contains a regulator for regulating the DC output voltage to a target value. The regulator contains a set of parameters for determining its regulation behavior. The converter contains a measurement module for determining at least one characteristic value of at least one characteristic parameter of the converter.

The converter contains at least two interchangeable parameter sets for the regulator. Each respective parameter set can be or is activated in the regulator during operation. A first one of the parameter sets has a slower regulation behavior with regard to the output voltage than a second parameter set. The converter contains a control module for exchanging and activating each of the parameter sets in the regulator. Exchange and activation are carried out according to at least one of the characteristic parameters or the respective different characteristic values of the corresponding parameter.

Thus, if necessary (as indicated by the characteristic parameter or characteristic values) it is possible to switch from a slower parameter set to a parameter set with faster regulation behavior, in order to prevent an excessive increase or decrease in the output voltage or to counteract this more quickly. A short-term degradation in the power factor is accepted in this case. A corresponding changeover can be implemented quickly and easily. Conventional or established control concepts can each be maintained separately—in the form of a respective set of control parameters. There is no need to create a new overarching control concept, it is only necessary to change between conventional control concepts.

Between the changeovers of parameter sets, hysteresis effects are provided for the characteristic values, so that in the case of a characteristic value near to a threshold value a continuous switching back and forth between faster and slower parameter sets is prevented.

In particular, the characteristic value is a value of the characteristic parameter at the current time. This means that a real-time adjustment of the regulator can be made in the converter by a rapid response to the current characteristic value, in order to respond in particular to the current voltage value of the output voltage as a characteristic value.

In a preferred embodiment the characteristic value is the DC output voltage and/or a time or a time interval and/or a power transported by the converter or its temporal rate of change. Thus, by means of the control module, the selection of the current parameter set can be oriented to, or made dependent upon, the parameters that are critical to determining the properties of the converter.

In a preferred variant of this embodiment, a faster parameter set (starting from a currently active slower set) is or will be activated when the output voltage is outside of a tolerance range or departs from it and/or if a rate of change of the power per unit time exceeds a threshold value. It is precisely when the output voltage deviates from a target value, or the tolerance range around this target value, that fast regulation is important in order to adjust the voltage back to its target value. A particular risk of collapse or overshoot of the output voltage exists in the event of fast load or power changes, thus when a change in power per unit time exceeds a certain threshold (for example, a doubling or halving of the power within 10 ms to 50 ms). In these cases, a rapid adjustment of the output voltage is necessary or might be required, which can be achieved on the basis of the faster regulation.

In a preferred variant of this embodiment a slower parameter set (starting from a currently active faster set) is or will be activated when the output voltage is within or enters the tolerance range, and/or if the rate of change of the power per unit time does not exceed or falls below a threshold value and/or if a time interval following activation of a faster parameter set has expired. Following the above, in the case of a voltage close to the target voltage or only a slow rate of change in the power, an overshoot or collapse of the output voltage is no longer to be expected, so that a slower regulation with an improved power factor is possible or sought again. In particular, by limiting the duration of a faster regulation (and thus an inferior power factor), the time-averaged power factor can be kept high, so that, for example, certain standardized limits can be complied with under all operating conditions.

In a preferred embodiment the regulator has an inner partial regulator for a current value of a current consumed by the converter and an outer partial regulator for a voltage value of the DC output voltage. The parameter set of the outer partial regulator is interchangeable, in particular exclusively.

The regulator therefore has an outer control loop (with the outer partial regulator) and an inner control loop contained therein (with the inner partial regulator) inside the outer control loop.

The interchangeable parameter set is the parameter set of the outer partial regulator or outer control loop. This embodiment corresponds to a widespread control structure for DC-DC converters. The invention is therefore suitable for this widespread converter design.

The invention is therefore also particularly effective at the most critical point for the output voltage of a DC-DC converter, namely the voltage regulation, by the voltage regulation being implemented with parameter sets appropriate to current requirements.

In a preferred embodiment, the converter comprises a memory for the parameter sets. Thus, the parameter sets can be retrieved quickly as required and are immediately available in the regulator.

In a preferred alternative design of this embodiment, the memory contains a look-up table for the parameter sets. In particular, in this case a respective parameter set is assigned to each characteristic value, for example each voltage value, or any combination of characteristic values (in the case of multiple parameters). After determining the relevant characteristic value (values), all that is required is for the assigned parameter set to be quickly and simply extracted from the look-up table and fed to the regulator or activated there. This ensures a particularly fast and simple changing of the parameter sets in the converter.

In a preferred embodiment the converter is a boost converter. Boost converters are particularly affected by the problem of fluctuating output voltages, so that the invention can be applied particularly effective here. In particular, the converter is a CCM converter (continuous current mode) or a DCM converter (discontinuous current mode). In a further preferred embodiment the converter is designed as a PFC circuit. The objective of a PFC circuit (Power Factor Correction) is to optimize the harmonics, the spectrum of which is evaluated via the power factor, in such a way that in addition to the fundamental (the current at 50 Hz), only a small number of harmonics are included. The power factor thus describes the ratio of active power to apparent power consumed. These converter types are commonly used converters, which means the invention offers advantages over a wide technical area.

In a preferred embodiment the regulator is a digital regulator. A digital regulator in this sense outputs its regulation result only at certain times, in order to use this or make this usable in the converter. In the time interval until the next relevant time, no modified regulator intervention takes place in the converter. Such digital regulators are widely used, so that the invention offers advantages for a majority of converters.

In a preferred variant of this embodiment the activated parameter set in the regulator remains unchanged during a digital control cycle of the regulator. In the corresponding control cycle, the regulator performs specific internal calculations depending on input values in order to then provide its regulation result at its output. This ensures that during the internal processing in the regulator, no parameter change occurs in the regulator which could lead to unpredictable regulation results, thus avoiding this problem. The regulation and hence the converter thus become more stable.

The invention is based on the following findings, observations or considerations and has the following further embodiments. The embodiments are sometimes also referred to simplistically as "the invention". The embodiments can also contain parts or combinations of the above embodiments, or correspond to these and/or, where appropriate, also include embodiments not previously mentioned.

The invention is based on the recognition that the power factor therefore describes the ratio of active power to apparent power consumed. In order to optimize this ratio, in a PFC the primary method is to regulate the supply current that is consumed. The output voltage plays only a secondary role and for control engineering reasons can only be controlled with low dynamic response. By their nature, therefore, power supplies with PFC functionality usually have poor transient behavior, are only able to compensate poorly for abrupt load changes at the output and react with sharp voltage dips and spikes. If the poor transient behavior of the PFC stage is not acceptable for the application, it is conceivable in many cases, for example, to connect a second power supply stage with higher control dynamics between the PFC and the consumer.

In a modern audio amplifier the power supply can have a two-stage design, consisting of PFC and main power supply, which for reasons of cost and efficiency is often designed unregulated. Another possible implementation uses a single stage PFC.

If the amplifier is now required to deliver an abrupt change in power, this leads to a voltage dip at the output capacitor of the main power supply. This capacitor could of course use its own regulation (if in fact present) to keep the voltage dip to a minimum, but in any case, it will abruptly draw a high current from the DC link capacitor. Due to the inherently low voltage regulation dynamics of the PFC, it can only react slowly to the new load situation. Inevitably, there will be a sharp dip in the voltage on the DC link circuit.

Depending on the main power supply topology, this can also cause problems for the main power supply, possibly even a collapse of the output voltage. The latter is a problem especially in unregulated main power supply topologies. These transmit the DC link voltage to the output voltage side with only a fixed transmission factor, and therefore also the load reductions of the DC link voltage.

A further challenge for dynamically loaded PFC stages is that in the event of a dip in the DC link voltage below the current line voltage, the boost diode of the PFC begins to conduct and so the current consumed by the device can no longer be controlled by the PFC. On the one hand, it can no longer be ensured here that the boost diode is being operated at a safe operating point and on the other hand, the harmonic spectrum is undefined.

A control-engineering analysis of the situation is obtained as follows:

A PFC usually consists of two control loops. The inner current control loop regulates the consumed current and causes this to follow the supply voltage. This regulation requires a high dynamic response and is primarily responsible for the harmonic spectrum of the current consumed by the device. The second, outer control loop—the voltage regulation—regulates the DC link voltage (in the case of a classical two-stage boost PFC) or the output voltage (in single-stage designs). This must take account of the fact that the outer control loop, the voltage regulation, must have a much lower dynamic response than the inner current control loop.

If the voltage regulation has been designed with too great a dynamic response, it tries to smooth out the inherent 100 Hz ripple (at 50 Hz AC mains power) on the DC link, which results in an adverse effect on the harmonic spectrum. In particular, the third harmonic of the harmonic spectrum is significantly increased.

The basic idea of the invention, therefore, is as follows:

If the voltage on the DC-link capacitor is within certain limits, the DC link voltage is regulated using the slow regulation. This ensures the optimal power factor for low and medium loads. If a step change occurs in the load, the voltage on the output capacitor, and consequently also on the DC-link capacitor to some extent, dips sharply.

As soon as the DC link voltage drops below a certain threshold value, the control algorithm switches over to another, faster parameter set, which enables a rapid counter-response of the regulation, counteracting or even preventing a further collapse. This prevents the PFC voltage from dropping so far that the PFC diode becomes conductive and the current consumed becomes uncontrolled for one or more half-cycle/s of the supply.

As soon as the voltage on the DC link has exceeded an upper threshold value again, the regulation is switched back to the original control parameter set. It is also conceivable for this switchover to be alternatively controlled on the basis of the power or, for example, on a temporal basis.

This method has no relevant influence on the measured harmonic spectrum, which is subject to a standardized limit. This is determined by measuring the current consumed by the circuit over a specific period of time dependent on the applicable standard, but usually several seconds—and then decomposed into its components by Fourier analysis. Depending on the frequency of intervention, there is a slight, usually non-critical, increase in the measured value in higher-frequency harmonics. A continuous operation with these modified control parameters is not possible, since, as described above under the control engineering analysis, this would lead to a sharp increase in the third harmonic.

The main distinctive feature of this method lies in the prevention/reduction of the voltage dip across the DC-link capacitor and in extreme situations, preventing the bypass of the PFC due to the boost diode becoming conducting.

The invention is based on the recognition that the principle of dynamic control parameter modification can also be used in a wide variety of other applications in addition to audio amplifiers. Whenever the consumer operated by a power supply with PFC function has a high dynamic response, by using this invention the stability of the internal operating voltage can be increased. Since in most cases electronic devices are nowadays controlled by digital control units, in many cases a suitable signal indicating the power absorbed by the consumer is available, which is incorporated into the regulation of the PFC stage in an appropriate manner.

In accordance with the invention, an improvement is obtained in particular in the transient behavior of dynamically loaded PFC circuits in audio amplifiers by means of DC-link voltage-dependent control parameters.

BRIEF DESCRIPTION OF THE DRAWINGS

Other features, effects and advantages of the invention are derived from the following description of a preferred exemplary embodiment of the invention and from the accompanying FIGURES. Shown is, in a schematic diagram:

FIG. 1 a converter according to the invention.

DETAILED DESCRIPTION

FIG. 1 shows a converter 2 in the form of a CCM Average Current Mode Boost Converter.

The converter 2 is used to convert a DC input voltage UE into a DC output voltage UA. The converter 2 contains an inductance 4 and a capacitance 6, which are interconnected in a power-conducting path 8.

The converter 2 contains a regulator 12 for regulating the current voltage value of the output voltage UA to a target value UAS. The regulator 12 contains a set of parameters 14a which currently determines its regulation behavior. The parameter set 14a is therefore currently activated in the regulator 12.

The converter 2 also contains a measurement module 16 for determining at least one characteristic value K of at least one characteristic parameter 18 of the converter 2. In the example the characteristic parameter 18 is the output voltage UA, the characteristic value K is the current voltage value UAI (actual value of UA). The measurement module 16 is therefore a voltage meter. Alternatively or additionally, in other embodiments the characteristic parameter 18 is a power P which is transported by the converter (indicated by an arrow), or a time to during which a parameter set 14 is activated. The measuring module 16 is then designed as a power meter or timer (not shown).

Overall, the converter 2 contains a plurality of parameter sets 14a-c for the regulator 12. The parameter sets 14b or 14c can also be activated in the regulator 12. The respective active parameter set 14a or b or c then determines the current regulation behavior. The other two respective parameter sets 14 are then not activated. The (activated) parameter sets 14 are thus interchangeable in the regulator 12.

In the example, the parameter set 14a is activated first. The regulator 12 is therefore operating on the basis of parameter set 14a. The parameter sets 14b and 14c currently have no influence on the regulation behavior.

The converter 2 contains a control module 20. This serves both to exchange and to activate each of the parameter sets 14a to c in the regulator 12. The exchange and activation are accomplished by the control module 20 depending on at least one of the characteristic parameters 18, wherein in the example only one characteristic parameter 18, the output voltage UA, is present. In the example its characteristic value K is in each case a current value (voltage value UAI) of the characteristic parameter 18 (UA). In an alternative example, a second characteristic parameter 18 exists in the form of the power P. The corresponding additional characteristic value K is then the current power value of the power P, or the change in the power per unit time. Therefore, two different characteristic values K exist in the converter 2, which are both fed to the control module 20 and are used by this to select the parameter sets 14a to c.

The regulator 12 has an inner partial regulator 22 (part of an inner control loop) and an outer partial regulator 24 (part of an outer control loop). The inner control loop or the partial regulator 22 regulates the current value Ia to a target value IS. The outer control loop or the partial regulator 24 finally adjusts the DC output voltage UA based on its current voltage value, the actual value UAI, to its target value UAS. Only the parameter sets 14a-c of the outer partial regulator 24 are interchangeable. The inner partial regulator 22 thus operates with a fixed parameter set.

The converter 2 has a memory 26 for the parameter sets 14a-c, wherein the memory 26 contains a look-up table for the parameter sets 14a-c, or is implemented as such. In the example, therefore, the characteristic value K in the form of the value of the voltage value UAI is compared with each value range 28a-c, and if the value K is within the corresponding value range 28a-c, the relevant parameter set 14a or 14b or 14c is activated and used for the regulation of the regulator 12.

In the example the regulator 12 is a digital regulator. The characteristic values K and the DC output voltage UA are therefore supplied via analog/digital converters 30. (A/D converters). From currently sampled values UA[n] and K[n] and corresponding values from the previous sampling intervals [n−1] and [n−2], not described further, stored in the regulator 12, a current regulator result in the form of a duty cycle PWM for a pulse width modulation, thus a value PWM[n], is output by a PWM stage 32 as the current regulation result. In the process, the duty cycles PWM[n−1] and PWM[n−2] output at the previous sampling times [n−1] and [n−2] are also taken into account in the regulator 12. The duty cycle PWM operates a switch 34 in the converter 2, as is generally the case in standard transformers, which is therefore not further explained here.

The time interval between the output of a duty cycle PWM[n] and the input of the corresponding values UA[n] and K[n] is called the control cycle Z and is represented symbolically in FIG. 1 by an arrow. During the period of a control cycle Z the corresponding parameter set 14*a*, *b*, or *c* remains constantly active in the regulator 12, which means the entire control algorithm is executed according to one of the parameter sets 14*a* to *c*. Only after the completion of the control cycle Z and before the start of a new control cycle Z—that is, before the start of the evaluation of the output voltage UA and the characteristic parameter K in the regulator 12—can another of the parameter sets 14*a-c* be activated if necessary, depending on the decision of the control unit 20.

The invention claimed is:

1. A converter (2) for converting a DC input voltage (UE) into a DC output voltage (UA), the converter comprising
a regulator (12) for regulating the DC output voltage (UA) to a target value (UAS), wherein the regulator (12) comprises a parameter set (14*a-c*) that determines the regulation behavior thereof,
wherein the converter (2) comprises a measurement module (16) configured for determining at least one characteristic value (K) of at least one characteristic parameter (18) of the converter (2),
wherein the converter (2) contains at least two interchangeable parameter sets (14*a-c*) for the regulator (12), wherein each one of the parameter sets (14*a-c*) can be activated in the regulator (12),
wherein a first one of the parameter sets (14*a-c*) has a slower regulation behavior with regard to the DC output voltage (UA) than a second of the parameter sets (14*a-c*), and
wherein the converter (2) comprises a control module (20) configured for the exchange and activation of each of the parameter sets (14*a-c*) in the regulator (12) depending on at least one of the characteristic parameters (18).

2. The converter (2) according to claim 1, characterized in that
the characteristic parameter (18) is the output voltage (UA) and/or a time (ta) and/or a power (P) transported by the converter (2).

3. The converter (2) according to claim 2, characterized in that
a faster parameter set (14*a-c*) is activated when the output voltage (UA) is outside of a tolerance range and/or if a rate of change of the power (P) per unit time exceeds a threshold value.

4. The converter (2) according to claim 2, characterized in that
a slower parameter set (14*a-c*) is activated when the output voltage (UA) is within the tolerance range and/or if the rate of change of the power (P) per unit time falls below a specified threshold value and/or if a time interval (ta) following activation of a faster parameter set has expired.

5. The converter (2) according to claim 1 claims, characterized in that
the regulator (12) comprises an inner partial regulator (22) for the current value (Ia), and an outer partial regulator (24) for a voltage value (UAI) of the DC output voltage (UA), and the parameter set (14*a-c*) of the outer partial regulator (22) is interchangeable.

6. The converter (2) according to claim 1, further comprising
a memory (26) for the parameter sets (14*a-c*).

7. The converter (2) according to claim 6, characterized in that
the memory (26) contains a look-up table for the parameter sets (14*a-c*).

8. The converter (2) according to claim 1, characterized in that
the converter (2) is a boost converter.

9. The converter (2) according to claim 1, characterized in that
the regulator (12) is a digital regulator (12).

10. The converter (2) according to claim 9, characterized in that
the activated parameter set (14*a-c*) in the regulator (12) is unchanged during a digital control cycle (Z) of the regulator (2).

11. The converter (2) according to claim 1, wherein the converter (2) contains three of the interchangeable parameter sets (14*a-c*) for the regulator (12), wherein one of the parameter sets (14*a-c*) is selectively activated by the regulator (12).

12. A converter (2) for converting a DC input voltage (UE) into a DC output voltage (UA), the converter comprising
a regulator (12) for regulating the DC output voltage (UA) to a target value (UAS), wherein the regulator (12) includes an inner partial regulator (22) for the current value (Ia), and an outer partial regulator (24) for a voltage value (UAI) of the DC output voltage (UA), wherein at least two interchangeable parameter sets (14*a-c*) of the outer partial regulator (22) are interchangeable and can be activated for determining a regulation behavior thereof, and wherein a first one of the parameter sets (14*a-c*) has a slower regulation behavior with regard to the DC output voltage (UA) than a second of the parameter sets (14*a-c*),
a measurement module (16) for determining at least one characteristic value (K) of at least one characteristic parameter (18) of the converter (2), and
a control module (20) configured for the exchange and activation of each of the parameter sets (14*a-c*) in the outer partial regulator (22) depending on the at least one characteristic parameter (18).

13. The converter (2) according to claim 12, wherein only the parameter sets 14*a-c* of the outer partial regulator (24) are interchangeable, and
wherein the inner partial regulator (22) operates with a fixed parameter set.

14. The converter (2) according to claim 12, wherein the converter (2) contains three of the interchangeable parameter sets (14*a-c*) for the outer partial regulator (22), and wherein one of the parameter sets (14*a-c*) is selectively activated and used for the regulation of the outer partial regulator (24).

15. The converter (2) according to claim 12, wherein the converter (2) has a memory (26) for the parameter sets (14a-c), wherein the memory contains a look-up table for the parameter sets (14a-c), and wherein the characteristic value (K) of the at least one characteristic parameter (18) is compared with each value range (28a-c), and when the characteristic value (K) is within the corresponding value range (28a-c), the relevant parameter set is activated and used for the regulation of the outer partial regulator (22).

16. A power factor correction converter (2) for converting a DC input voltage (UE) into a DC output voltage (UA), the power factor correction converter comprising:
- a regulator (12) for regulating the DC output voltage (UA) to a target value (UAS), wherein the regulator (12) comprises a parameter set (14a-c) that determines the regulation behavior thereof,
- wherein the power factor correction converter (2) comprises a measurement module (16) configured for determining at least one characteristic value (K) of at least one characteristic parameter (18) of the power factor correction converter (2),
- wherein the power factor correction converter (2) contains at least two interchangeable parameter sets (14a-c) for the regulator (12), wherein each one of the parameter sets (14a-c) can be activated in the regulator (12), wherein a first one of the parameter sets (14a-c) has a slower regulation behavior with regard to the DC output voltage (UA) than a second of the parameter sets (14a-c), and
- wherein the power factor correction converter (2) comprises a control module (20) configured for the exchange and activation of each of the parameter sets (14a-c) in the regulator (12) depending on at least one of the characteristic parameters (18).

17. The power factor correction converter (2) according to claim 16, wherein the power factor correction converter optimizes harmonics, a spectrum of which is evaluated via a power factor, so that in addition to a fundamental, only a small number of harmonics are included.

\* \* \* \* \*